United States Patent [19]

Adur et al.

[11] Patent Number: 4,537,836

[45] Date of Patent: Aug. 27, 1985

[54] COMPOSITE STRUCTURES

[75] Inventors: Ashok M. Adur, Wescosville, Pa.; Seymour Schmukler, Palatine, Ill.; John Maconis, Jr., Schaumburg, Ill.; Mitsuzo Shida, Barrington, Ill.

[73] Assignee: Chemplex Company, Rolling Meadows, Ill.

[21] Appl. No.: 677,843

[22] Filed: Dec. 4, 1984

Related U.S. Application Data

[60] Division of Ser. No. 510,292, Jul. 1, 1983, Pat. No. 4,487,885, and a continuation-in-part of Ser. No. 468,871, Feb. 22, 1983, abandoned, which is a division of Ser. No. 339,984, Jan. 18, 1982, abandoned, said Ser. No. 510,292, is a continuation-in-part of Ser. No. 339,984.

[51] Int. Cl.$^3$ .............................................. B32B 27/32
[52] U.S. Cl. ................................. 428/522; 428/476.1; 428/523
[58] Field of Search ............................. 428/522, 523

[56] References Cited

U.S. PATENT DOCUMENTS

| | | | |
|---|---|---|---|
| 3,658,948 | 4/1972 | McConnell | 260/897 B |
| 3,746,676 | 7/1973 | Joyner et al. | 260/27 |
| 3,868,433 | 2/1975 | Bartz et al. | 260/876 R |
| 3,873,643 | 3/1975 | Wu et al. | 260/878 R |
| 3,882,494 | 5/1975 | Krebaum et al. | 260/878 R |
| 4,087,587 | 5/1978 | Shida et al. | 428/500 |
| 4,087,588 | 5/1978 | Shida et al. | 428/500 |
| 4,370,388 | 1/1983 | Mito et al. | 428/461 |
| 4,409,364 | 10/1983 | Schmukler et al. | 525/74 |
| 4,416,944 | 11/1983 | Adur | 428/523 |
| 4,481,262 | 11/1984 | Shida | 428/522 |

*Primary Examiner*—Paul R. Michl
*Attorney, Agent, or Firm*—Wood, Dalton, Phillips, Mason & Rowe

[57] ABSTRACT

Composite structures incorporating resin blends that are strong adhesives to various substrates and especially to polar substrates. The blends comprise (a) a graft copolymer of a polyethylene backbone grafted with at least one grafting monomer comprising one or more polymerizable ethylenically unsaturated carboxylic acids or acid derivatives such as acid anhydrides, acid esters, salts, amides, imides and the like, (b) a LDPE, a linear low density polyethylene, or an ethylene-unsaturated ester copolymer, and (c) a poly ($\alpha$-olefin).

59 Claims, No Drawings

COMPOSITE STRUCTURES

CROSS-REFERENCE TO RELATED APPLICATIONS

This application is a division of commonly assigned application Ser. No. 510,292 filed July 1, 1983, now U.S. Pat. No. 4,487,885 issued December 11, 1984, which is a continuation-in-part of commonly assigned application Ser. No. 339,984 filed Jan. 18, 1982, now abandoned, and this application is also a continuation-in-part of commonly assigned application Ser. No. 468,871 filed Feb. 22, 1983, now abandoned, which is a division of application Ser. No. 339,984 filed Jan. 18, 1982, now abandoned.

BACKGROUND OF THE INVENTION

Adhesive blends for polar substrates and the resulting composite structures are finding great utility in industry at the present time. It is well known that blends of high density polyethylene (HDPE) or low density polyethylene (LDPE) or ethylene-vinyl acetate copolymers (EVA) with a high density polyethylene grafted with suitable unsaturated carboxylic acid or carboxylic acid anhydrides or other acid derivatives are adherent to certain polar polymers such as polyamides. On the other hand, adhesion to certain other polar polymers such as polyesters and saponified ethylene-vinyl acetate copolymer(ethylene-vinyl alcohol copolymer [EVOH]) is not sufficiently great in many instances.

The blends used in the composite structures of this invention provide high bond strength to polyester and ethylene-vinyl alcohol copolymers. The adhesion compared to that with blends prepared hitherto is very much improved. Also, the excellent bond strength to polyolefins, and other polar substrates, is retained. These polar substrates include polyvinyl polymers, metals, polyamides, glass, paper, wood, etc.

SUMMARY OF THE INVENTION

By grafting suitable unsaturated carboxylic acids or acid derivatives such as acid anhydrides, acid chlorides, acid esters, salts, amides and imides and the like to a polyolefin such as polyethylene of density 0.910 to 0.970 g/cc, and blending the resultant polymer (a) with (b) a low density or linear low density polyethylene of density of about 0.910 to 0.945 g/cc or an ethylene-unsaturated ester copolymer resin, and (c) a poly($\alpha$-olefin) selected from homopolymers and copolymers of olefin monomers with 4–15 carbon atoms, such as poly(-butene-1) [also known as polybutylene], poly(hexene-1), poly(4-methyl pentene-1) and the like, we have obtained adhesive resins with excellent adhesive strength both to polyolefins and to various substrates.

These substrates include polar polymers such as nylon and other polyamides, ethylene-vinyl alcohol copolymers, polyvinyl alcohol and its copolymers, polyester polymers, polyurethanes and other carbonyl-containing polymers, metals, glass, paper, wood and the like.

The resulting composite structures can be in the form of films, containers, bottles, tubes, sheets, etc. They can be made by any method known to one skilled in the art. Examples of such methods are co-extrusion, molding, lamination, coating or a combination of these methods or any other method for joining dissimilar materials known to those skilled in the art. The poly($\alpha$-olefin) aids in the adhesion to the polar substrate since without its presence, poorer adhesion is obtained to polar substrates including polar polymers and especially to ethylene-vinyl alcohol copolymers and polyesters.

DESCRIPTION OF THE PREFERRED EMBODIMENTS

The term polyethylene used for the grafting backbone includes ethylene polymers, copolymers and terpolymers of ethylene with less than 40% of one or more alkenes such as propylene, butene-1, hexene-1, 4-methyl pentene-1, octene-1 and such other unsaturated aliphatic hydrocarbons. Linear polyethylenes, either high, medium or low density polyethylenes, are preferred.

Also, it is preferable sometimes to graft the blends of two or more of the above homopolymers and copolymers.

The term "low density or linear low density polyethylene or any ethylene-unsaturated ester copolymer" used as a blending component (b) includes the linear low density polyethylene generally prepared by copolymerizing ethylene with less than 50% $\alpha$-olefin using transition metal catalysts such as compounds of titanium, vanadium, aluminum, chromium and the like, or branched low density polyethylene usually prepared by the high pressure process or copolymers of ethylene and unsaturated esters such as vinyl acetate, ethyl acrylate, methyl acrylate, ethyl methacrylate and the like. The range of density can be from about 0.91 to 0.97 g/cc and MI of 0.1 to 100 g/10 min. It is preferable to use a 0.91 to 0.93 g/cc density polyethylene having a melt index of 0.5 to 20 g/10 min.

The term "poly($\alpha$-olefin)" used as blending component (c) includes poly(butene-1), poly(hexene-1), poly(octene-1), and other homopolymers and copolymers that contain greater than 50 wt.% of $\alpha$-olefins (with 4–15 carbon atoms). It is preferable to use poly(butene-1) of melt index 0.5 to 50 g/10 min. as determined by ASTM Test Procedure D1238 and a density range of 0.88 to 0.93 g/cc for this invention. The poly($\alpha$-olefin) blending component homopolymers and copolymers are preferably non-elastomeric.

The backbone of the graft copolymers includes homopolymers of ethylene and copolymers of ethylene with up to 40 wt.% of such higher olefins as propylene, 1-butene and 1-hexene and may contain di- or triolefins as are used commercially in ethylene-propylene terpolymers such as ethylidene-norbornene, methylenenorbornene, 1,4-hexadiene and vinylnorbornene. Also, it is preferable sometimes to graft blends of two or more of the above homopolymers, copolymers and terpolymers. While the above polymers represent the preferred embodiments of our invention, they should not be regarded as limiting in any way.

The unsaturated carboxylic acids or acid anhydrides used as the grafting monomers include compounds such as acrylic acid, methacrylic acid, fumaric acid, maleic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, x-methylbicyclo(2.2.1)hept-5-ene-2,3-dicarboxylic acid anhydride, x-methylnorborn-5-ene-2,3-dicarboxylic acid anhydride, norborn-5-ene-2,3-dicarboxylic acid anhydride, Nadic anhydride, methyl Nadic anhydride, Himic anhydride, methyl Himic anhydride and other fused ring monomers described in U.S. Pat. Nos. 3,873,643 and 3,882,194, both assigned to the assignee hereof.

Cografting monomers as described in U.S. Pat. No. 3,882,194 are also useful for preparing the graft copolymers of this invention.

Included among the conjugated unsaturated esters suitable for cografting are dialkyl maleates, dialkyl fumarates, dialkyl itaconates, dialkyl mesaconates, dialkyl citraconates, alkyl acrylates, alkyl crotonates, alkyl tiglates and alkyl methacrylates where alkyl represents aliphatic, aryl-aliphatic and cycloaliphatic groups containing 1–12 carbon atoms. Esters particularly useful in the cografted copolymers of this invention are dibutyl maleate, diethyl fumarate and dimethyl itaconate. Among the acids and acid anhydrides particularly useful in the cografted copolymers of this invention are maleic anhydride, fumaric acid, x-methylbicyclo(2.2.1-)hept-5-ene-2,3-dicarboxylic acid anhydride and bicyclo(2.2.1)hept-5-ene-2,3-dicarboxylic acid anhydride.

It is often desirable to use more than one monomer in either or both classes of monomers in order to control the physical properties of the final products. The method in general consists of heating a mixture of the polymer or polymers and the monomer or monomers with or without a solvent. The mixture can be heated to above the melting point of the polyolefin with or without a catalyst. Thus, the grafting occurs in the presence of air, hydroperoxides, other free radical catalysts or preferably in the essential absence of those materials where the mixture is maintained at elevated temperatures and (if no solvent is used) preferably under high shear.

A convenient method of accomplishing the reaction is to premix the ingredients and then extrude the composition through a heated extruder. Other mixing means, such as a Brabender mixer, a Banbury mixer, roll mills and the like may also be employed for the process. In order to prevent undue increase in molecular weight with a possibility of some cross-linking at elevated temperatures, it is desirable to carry out the reaction in a closed vessel. A conventional single or multiple screw extruder accomplishes this result without the use of auxiliary equipment and for this reason is a particularly desirable reaction vessel.

The graft and cograft copolymers are recovered by any method or system which separates or utilizes the graft copolymer that is produced. Thus, the term includes recovery of the copolymer in the form of precipitated fluff, pellets, powders and the like, as well as further chemically reacted or blended pellets, powders and the like or in the form of shaped articles formed directly from the resulting copolymer.

The resulting copolymers are found to consist of about 70–99.95 wt.% of polyethylene and about 0.05–30 wt.% of the unsaturated acid or acid anhydride or mixtures.

The cograft copolymers consist of about 50–99.9 wt.% of polyolefin, about 0.05–25 wt.% of the unsaturated acid or acid anhydride or mixtures thereof and about 0.05–25 wt.% of the unsaturated ester and mixtures thereof. These resulting graft copolymers are capable of being blended or reacted with a wide variety of other materials to modify the copolymer further.

The adhesive blends of this invention contain, per 100 parts by weight of blend, between about 0.1 and less than 40 parts by weight of graft or cograft copolymer, between about 0.1 and 99 parts by weight of component (b), and between about 0.1 and 60 parts by weight of blending component (c).

Adhesive blends of this invention can be used in composites containing polar substrates such as nylon, ethylene vinyl alcohol copolymers (EVOH), polyvinyl alcohol (PVA), polyester, polyurethane, metals, etc. These compositions can be just two layers or they can be three or more layers with materials which adhere to either layer being added to the structure. For instance, polyolefins like polyethylene (PE), ethylene vinyl acetate copolymers (EVA) or ethylene copolymers with other monomers and polypropylene (PP) can be used in these layers. It is obvious that many combinations can be made by one skilled in the art of using the principles disclosed.

The methods for this joining can be lamination, coextrusion, extrusion lamination, coextrusion coating or any other method for joining dissimilar materials to form composite structures known to those skilled in the art.

Some examples of these composites are: adhesive of this invention/nylon, adhesive/polyethylene, adhesive/polyester, adhesive/ethylene-vinyl acetate copolymer, adhesive/ethylene-vinyl alcohol copolymer, adhesive/aluminum, adhesive/steel, adhesive/glass, adhesive/wood, adhesive/leather, polyolefin/adhesive/nylon, polyolefin/adhesive/EVOH, adhesive/nylon/adhesive/polyolefin, polyolefin/adhesive/EVOH/adhesive/polyolefin, polyolefin/adhesive/polyester, EVA/adhesive/EVOH, EVA/adhesive/polyesters, polyolefin/adhesive/polyester/adhesive, and polyolefin/adhesive/polyester/adhesive/polyolefin.

Examples of other combinations are aluminum/adhesive/aluminum or adhesive/aluminum/adhesive or polyolefin/adhesive/aluminum/adhesive/polyolefin. Other metals such as copper, steel, brass, etc. can also be used. Dissimilar metal examples are: aluminum/adhesive/copper, aluminum/adhesive/steel, aluminum/adhesive/brass, etc. One could also have combinations in which one has a metal/adhesive/polar polymer. Examples of these would be aluminum/adhesive/nylon or aluminum/adhesive/EVOH, or steel/adhesive/nylon/adhesive/steel. Here again, one skilled in the art can find a number of obvious combinations from the principles described above.

The term "polyester" used as a substrate in these composites includes homopolymers (essentially comprising the reaction product of a dicarboxylic acid or its derivative with a diol or its derivative) and copolymers (essentially comprising the reaction product of one or more dicarboxylic acids or its derivatives with one or more diols or its derivatives). The dicarboxylic acids and the diols referred to above can be aliphatic, aromatic or alicyclic. Examples of such carboxylic acids are terephthalic acid, isophthalic acid, cyclohexanedicarboxylic acids and the like.

Examples of such diols are ethylene glycol, dihydroxypropane(propylene glycol), dihydroxy-butane(butylene glycol), denzenedimethanol, cyclohexanedimethanol and the like.

The composites of this invention can be used to manufacture many different useful articles. They can be used as packaging films, blow molded bottles, coextruded sheet which can be thermoformed into container, coatings on glass bottles or wood or metal or even to join two metals, either the same metal or dissimilar metals, into a lamination.

In preparing the blends in the examples below from the above graft copolymers, ethylene homopolymers and copolymers, and poly(α-olefin)s, any blending equipment or technique may be used. As an example, blends can be prepared in an electrically heated Brabender Plasticorder mixing head using a scroll type mixer under the following conditions: temperature—325° F., rotor speed—120 rpm and mixing time—10 minutes after flux.

All blends preferably contain an antioxidant package.

In most of the specific examples, the resultant blends were compression molded into films approximately 0.005-0.007 inches thick. The films were then heat sealed to the substrate under evaluation at an appropriate temperature and time.

EXAMPLE 1

An electrically heated C. W. Brabender mixing unit was used for blending 45 wt.% of a linear low density polyethylene resin of a melt index of 3.1 g/10 min. and a density of 0.921 g/cc with 45 wt.% of a poly(butene-1) of melt index 1.0 g/10 min. and density 0.910 g/cc and 10 wt.% of a high density polyethylene of density 0.96 g/cc grafted with x-methyl bicyclo(2.2.1)hept-5-ene-2,3-dicarboxylic acid anhydride (XMNA) such that the grafted high density polyethyelene had a melt index of 1.5 g/10 min. and graft level of 1.5 wt.%. The blend was tested for adhesion to ethylene-vinyl alcohol copolymer film on a heat sealer set at 430° F. for 1 sec. An inseparable bond was obtained, and the adhesion was greater than 6.6 lb/in.

EXAMPLE 2

The poly(butene-1) in Example 1 was changed to one with a melt index of 1.8 g/10 min. and a density of 0.915 g/cc. The blend thus prepared gave greater than 6.9 lb/in when heat sealed to a film of ethylene-vinyl alcohol copolymer at 430° F. for 1 sec.

EXAMPLE 3

The poly(butene-1) in Example 1 was changed to one with a melt index of 2.0 g/10 min. and a density of 0.908 g/cc. The blend thus prepared when heat sealed at 430° F. and 1 sec. to the following substrates gave results as follows:

| Substrate | Adhesion | Bond |
|---|---|---|
| Ethylene-vinyl alcohol copolymer | >7.3 lb/in | inseparable |
| Medium density polyethylene 3 MI, 0.932p | >7.5 lb/in | inseparable |
| Nylon 6 | 3.9 lb/in | elongation |

EXAMPLE 4

An electrically heated C. W. Brabender mixing unit was used for blending 45 wt.% of a medium density polyethylene of melt index 3 g/10 min. and density of 0.932 g/cc with 45 wt.% of a poly(butene-1) of melt index 2.0 g/10 min. and of density of 0.908 g/cc and 10 wt.% of high density polyethylene grafted with x-methyl bicyclo(2.2.1)hept-5-ene-2,3-dicarboxylic acid anhydride similar to that used in Example 1. This blend was then heat-sealed to nylon 6 and to ethylene-vinyl alcohol copolymer at 430° F. and 1 sec. The adhesion to nylon 6 was 2.6 lb/in and 3.0 lb/in to ethylene-vinyl alcohol copolymer.

EXAMPLE 5

The linear low density resin in Example 3 was replaced by one with a melt index of 2.5 g/10 min. and a density of 0.918 g/cc. The blend thus made was heat-sealed to films of nylon 6 and ethylene-vinyl alcohol copolymer at 430° F. and 1 sec. The adhesion was greater than 5.4 and 7.1 lb/in respectively. Inseparable bonds were obtained.

EXAMPLES 6-22

An electrically heated C. W. Brabender mixing unit was used for blending a linear low density polyethylene (LLDPE) resin of melt index 2.0 g/10 min. and density 0.920 g/cc with a poly(butene-1) of melt index 2.0 g/10 min. and a density of 0.908 g/cc and a high density polyethylene grafted with x-methyl bicyclo(2.2.1)hept-5-ene-2,3-decarboxylic acid anhydride (XMNA) similar to that used in Example 1 such that the following weight percent composition ratios were used for making blends. These blends were then heat-sealed to ethylene-vinyl alcohol copolymer at 430° F. for 1 sec. The adhesions obtained are listed in the last column below:

| Example | LLDPE | Poly(butene-1) | Graft Copolymer | Adhesion (lb/in) |
|---|---|---|---|---|
| 6 | 90 | 0 | 10 | 2.3 |
| 7 | 80 | 10 | 10 | >8.8* |
| 8 | 70 | 20 | 10 | >8.5* |
| 9 | 60 | 30 | 10 | >9.9* |
| 10 | 50 | 40 | 10 | >7.1 |
| 11 | 45 | 45 | 10 | >7.6 |
| 12 | 30 | 60 | 10 | 6.6 |
| 13 | 80 | 0 | 20 | 6.0 |
| 14 | 70 | 10 | 20 | >10.0* |
| 15 | 60 | 20 | 20 | >10.0* |
| 16 | 20 | 60 | 20 | 3.8 |
| 17 | 85 | 5 | 10 | >5.4 |
| 18 | 75 | 5 | 20 | >5.1 |
| 19 | 88 | 2 | 10 | 2.9 |
| 20 | 89 | 1 | 10 | 3.9 |
| 21 | 86.5 | 3.5 | 10 | 4.9 |
| 22 | 89.5 | 0.5 | 10 | 3.7 |

*indicates could not peel apart

EXAMPLES 23-25

An electrically heated C. W. Brabender mixing unit was used for blending a linear low density polyethylene resin (LLDPE) of melt index 1 g/10 min. and a density of 0.924 g/cc with a poly(butene-1) resin (PB) of melt index 2.0 g/10 min. and a density of 0.908 g/cc along with a high density polyethylene grafted with x-methyl bicyclo(2.2.1)hept-5-ene-2,3-dicarboxylic acid anhydride (XMNA) in the following percentage ratios. The adhesions were carried out in a heat-sealer at 430° F. for 1 sec. The adhesion values in lb/in obtained to aluminum film (Al), ethylene-vinyl alcohol copolymer film (EVOH) and nylon 6 film (N-6) are given below:

| Example # | Percentage in Blend | | | Adhesion to Substrate | | |
|---|---|---|---|---|---|---|
| | LLDPE | PB | Graft Copolymer | Al | EVOH | N-6 |
| 23 | 80 | 10 | 10 | 4.8 | >5.9 | >5.0* |
| 24 | 90 | 0 | 10 | 3.7 | 0.8 | 3.6 |
| 25 | 70 | 20 | 10 | >10.0* | >6.8 | >4.3* |

*Indicates the samples could not be peeled apart

EXAMPLES 26–27

Instead of the linear low density polyethylene used in Examples 23 and 25, a low density polyethylene resin (LDPE) of melt index 1.8 g/10 min. and a density of 0.922 g/cc was used to make blends #26 and 27 respectively. The adhesion values obtained after heat-sealing to EVOH and Nylon 6 are given below:

| | Percentage in Blend | | | Adhesion to Substrate | |
|---|---|---|---|---|---|
| Example # | LDPE | PB | Graft Copolymer | EVOH | Nylon 6 |
| 26 | 80 | 10 | 10 | >6.5 | 3.8 |
| 27 | 70 | 20 | 10 | >5.7 | >4.2 |

EXAMPLES 28–29

Instead of the linear low density polyethylene used in Examples 23 and 24, a low density polyethylene (LDPE) of melt index 2.5 g/10 min. and a density of 0.919 g/cc was used in formulating blends #28 and 29 respectively. A linear low density polyethylene grafted with x-methyl bicyclo(2.2.1)hept-5-ene-2,3-dicarboxylic acid anhydride with melt index of 5.1 g/10 min. was used instead of the grafted HDPE. The adhesions obtained to ethylene-vinyl alcohol copolymer film (EVOH) and to nylon 6 film are given below in lbs/in:

| | Percentage in Blend | | | Adhesion to Substrate | |
|---|---|---|---|---|---|
| Example # | LDPE | PB | Graft Copolymer | EVOH | Nylon 6 |
| 28 | 90 | 0 | 10 | 2.2 | 3.1 |
| 29 | 80 | 10 | 10 | >7.9* | >4.0 |

*indicates could not separate

EXAMPLES 30–31

The low density polyethylene used in Examples 28 and 29 was substituted by another low density polyethylene of broad molecular weight distribution with a melt index of 5.5 g/10 min. and a density of 0.923 g/cc. The graft copolymer used in these cases was that used in Example 1. Adhesions obtained to ethylene-vinyl alcohol copolymer film (EVOH) and to a copolyester film are given below in lbs/in:

| | Percentage in Blend | | | Adhesion to Substrate | |
|---|---|---|---|---|---|
| Example # | LDPE | PB | Graft Copolymer | EVOH | Copolyester* |
| 30 | 90 | 0 | 10 | 3.9 | 3.2 |
| 31 | 80 | 10 | 10 | >5.7 | >5.1 |

*The heat sealer used was set at 500° F. and 5 seconds.
The copolyester was a polyethylene terephthalate glycol-modified (PETG)

EXAMPLE 32

The blend used in Example 29 was tested for adhesion to the same copolyester tested in Examples 30 and 31. The adhesion obtained was greater than 7.9 lbs/in.

EXAMPLE 33

The blend used in Example 7 was tested for adhesion to a commercial rubber-modified acrylontrile-methacrylate copolymer film with the heat sealer set at 350° F. for 1 second. The adhesion obtained was greater than 8.1 lbs/in.

EXAMPLE 34

A blend of 80% low density polyethylene used in Example 28, 10% poly(butene-1) copolymer used in Example 3 and 10% of the high density polyethylene graft copolymer used in Example 1 gave an adhesion greater than 4.0 lbs/in when heat sealed to a polyethyleneterephthalate film (PET) with the heat sealer set at 500° F. and 5 seconds.

EXAMPLE 35

A blend of 80% ethylene-vinyl acetate copolymer with melt index of 12.0 g/10 min. and 12% vinyl acetate content, 10% of the poly(butene-1) used in Example 3 and 10% of the linear low density polyethylene graft copolymer used in Example 28 gave an adhesion greater than 4.6 lb/in when heat sealed at 350° F. and 1 second to aluminum foil.

EXAMPLES 36–37

Blends of an ethylene-vinyl acetate copolymer (EVA) of melt index 3.0 g/10 min. and 9% vinyl acetate content with poly(butene-1) used in Example 3 and 10% of the linear low density polyethylene graft copolymer used in Example 28 were prepared with the following compositions. These blends were tested for adhesion to aluminum (Al) foil with the Sentinel heat sealer set at 250° F. and 1 second. The adhesion values obtained are shown below in lbs/in:

| | Percentage in Blend | | | Adhesion to Substrate |
|---|---|---|---|---|
| Example # | EVA | Graft | PB | Al |
| 36 | 90 | 10 | 0 | 0.8 |
| 37 | 80 | 10 | 10 | 3.0 |

EXAMPLES 38–39

Blends 38 and 39 were prepared similar to blends in Examples 36 and 37, respectively, except the ethylene-vinyl acetate copolymer (EVA) was changed to the one used in Example 35. These blends were then tested for adhesion to ethylene-vinyl alcohol copolymer film (EVOH) with the Sentinel heat sealer set at 430° F. and 1 second. The results of the adhesion are shown below in lbs/in:

| Example # | Percentage in Blend | | | Adhesion to Substrate |
|---|---|---|---|---|
| | EVA | PB | Graft Copolymer | EVOH |
| 38 | 90 | 0 | 10 | 3.9 |
| 39 | 80 | 10 | 10 | >5.1 |

EXAMPLES 40–41

Blends were prepared with the following compositions containing the linear low density polyethylene used in Example 6, poly(butene-1) used in Example 3, and a high density polyethylene graft copolymer grafted with maleic anhydride. The adhesions obtained to ethylene-vinyl alcohol copolymer (EVOH) when heat sealed at 430° F. for 1 second are shown below:

| Example # | Percentage in Blend | | | Adhesion to Substrate EVOH |
|---|---|---|---|---|
| | LLDPE | Graft Copolymer | PB | |
| 40 | 90 | 10 | 0 | 3.1 |
| 41 | 80 | 10 | 10 | >7.5 |

EXAMPLES 42–43

Blends were prepared with the following compositions containing the linear low density polyethylene used in Example 6, the high density graft copolymer used in Example 1, and poly(4-methyl pentene-1) (P4MP). These blends were tested for adhesion to aluminum foil, nylon 6 film, and ethylene-vinyl alcohol copolymer (EVOH) film with the heat sealer set at 430° F. and 1 second, respectively. The adhesions shown below are in lbs/in:

| Example # | Percentage in Blend | | | Adhesion to Substrate | | |
|---|---|---|---|---|---|---|
| | LLDPE | Graft Copolymer | P4MP | Nylon | Al | EVOH |
| 6 | 90 | 10 | 0 | 2.9 | 3.0 | 2.3 |
| 42 | 80 | 10 | 10 | 2.3 | >3.0 | 2.3 |
| 43 | 65 | 10 | 25 | >5.4 | >7.4 | >4.0 |

EXAMPLES 44–45

The blends used in Examples 31 and 29 were cast-coextruded with ethyl-vinyl alcohol copolymer (EVOH). The coextruded cast films obtained had a total thickness of about 3 mils. The adhesive layer of this invention had a thickness of 1.5 mil. The adhesions obtained were greater than 1.8 lb/in with blend No. 31 and 2.0 lb/in with blend No. 29. The film elongated during the T-peel test in each case.

Glossary Of Terms

Al—aluminum foil
EVA—ethylene vinyl acetate copolymer
EVOH—ethylene-vinyl alcohol copolymer
HDPE—high density polyethylene
LDPE—low density polyethylene
N-6—Nylon-6 film
LLDPE—linear low density polyethylene
PE—polyethylene
PB—poly(butene-1)
PETG—polyethylene terephthalate glycol-modified
PP—polypropylene
PVA—polyvinyl alcohol
P4MP—poly(4-methyl pentene-1)
PET—polyethylene terephthalate
XMNA—x-methylbicyclo(2.2.1)hept-5-ene-2,3-dicarboxylic acid anhydride.

Having described our invention as related to the embodiments set out herein, it is our intention that the invention be not limited by any of the details of description, unless otherwise specified, but rather be construed broadly within its spirit and scope as set out in the appended claims.

We claim:
1. A composite structure comprising:
    (a) a substrate, and adhered thereto
    (b) an adhesive blend consisting essentially of:
        (1) about 0.1 to less than about 40 parts by weight in said blend of a graft copolymer of about 70–99.95 wt.% of a polyethylene backbone grafted with about 30–0.05 wt.% of at least one grafting monomer comprising at least one polymerizable ethylenically unsaturated carboxylic acid or carboxylic acid derivative for a total of 100%, and
        (2) about 0.1–99 parts by weight in said blend of LDPE, or ethylene-unsaturated ester copolymers, or LLDPE or mixtures thereof, and
        (3) about 0.1–60 parts by weight in said blend of a blending component comprising a homopolymer or copolymer, or mixtures thereof, containing greater than about 50 wt.% of an α-olefin of 4–15 carbon atoms, for a total of components (1), (2) and (3) of 100 parts by weight.
2. The composite structure of claim 1 wherein said substrate comprises polyolefins, polar polymers, solid metals, glass, paper, wood, leather or cellophane.
3. The composite structure of claim 1 wherein said substrate comprises nylon.
4. The composite structure of claim 1 wherein said substrate comprises aluminum.
5. The composite structure of claim 1 wherein said ethylene-unsaturated ester copolymer of (b)(2) comprises a copolymer of ethylene and vinyl acetate or ethylmethacrylate or ethyl-acrylate or methylacrylate or methylmethacrylate.
6. The composite structure of claim 1 wherein said LLDPE of (b)(2) comprises a copolymer of ethylene and an unsaturated hydrocarbon.
7. The composite structure of claim 6 wherein said hydrocarbon comprises propylene, butene-1, 4-methyl pentene-1, hexene-1 or octene-1.
8. The composite structure of claim 1 wherein said α-olefin of component (b)(3) comprises butene-1, 4-methyl pentene-1, hexene-1, octene-1, or pentene-1, or mixtures thereof.
9. The composite structure of claim 1 wherein said grafting monomer of (b)(1) comprises at least one of acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride.
10. The composite structure of claim 1 wherein said substrate comprises an ethylene-vinyl alcohol copolymer.
11. The composite structure of claim 1 wherein said substrate comprises a polyester or a copolyester.
12. The composite structure of claim 1 wherein said substrate comprises an ethylene homopolymer or copolymer.
13. The composite structure of claim 1 wherein said substrate comprises a rubber-modified acrylonitrile-methacrylate copolymer.
14. The composite structure of claim 1 wherein said backbone of (b)(1) comprises polyethylene of a density within the range of 0.910–0.970 g/cc.

15. The composite structure of claim 1 wherein said (b)(2) comprises LDPE or LLDPE of a density within the range of 0.910–0.945 g/cc.

16. The composite structure of claim 1 wherein said backbone of (b)(1) comprises an ethylene polymer or a copolymer of ethylene with one or more alkenes.

17. The composite structure of claim 16 wherein said backbone of (b)(1) comprises a linear polyethylene of high, medium or low density.

18. The composite structure of claim 16 wherein said backbone of (b)(1) comprises a blend of two or more of said polymers or copolymers.

19. The composite structure of claim 1 wherein said poly-α-olefin of blending component (b)(3) comprises poly(butene-1) of melt index 0.5 to 50 g/10 min. and a density within the range of 0.88–0.93 g/cc.

20. A composite structure comprising:
(a) two or more substrates with adjacent pairs adhered together by
(b) an intervening layer of an adhesive blend consisting essentially of
(1) about 0.1 or less than about 40 parts by weight in said blend of a graft copolymer of about 70–99.95 wt.% of a polyethylene backbone grafted with about 30–0.05 wt.% of at least one grafting monomer comprising at least one polymerizable ethylenically unsaturated carboxylic acid or carboxylic acid derivative for a total of 100%, and
(2) about 0.1–99 parts by weight in said blend of LDPE, or an ethylene-unsaturated ester copolymer, or LLDPE or mixtures thereof, and
(3) about 0.1–60 parts by weight in said blend of a blending component comprising a homopolymer or copolymer, or mixtures thereof, containing greater than about 50 wt.% of an α-olefin of 4–15 carbon atoms, for a total of components (1), (2) and (3) of 100 parts by weight.

21. The composite structure of claim 20 wherein said (a) comprises a polar substrate and nylon.

22. The composite structure of claim 20 wherein said (a) comprises a polar substrate and an ethylene-vinyl alcohol copolymer.

23. The composite structure of claim 20 wherein said (a) comprises a polar substrate and aluminum.

24. The composite structure of claim 20 wherein said (a) comprises a polar substrate and a polyester or a copolyester.

25. The composite structure of claim 20 wherein said (a) comprises polar substrates.

26. The composite structure of claim 20 wherein said (a) comprises ethylene homopolymers and copolymers and a polar substrate.

27. The composite structure of claim 20 wherein said ethylene-unsaturated ester copolymers of (b)(2) comprise a copolymer of ethylene and vinyl acetate or ethylmethacrylate or ethylacrylate or methylacrylate or methylmethacrylate.

28. The composite structure of claim 20 wherein said LLDPE of (b)(2) comprises a copolymer of ethylene and an unsaturated hydrocarbon.

29. The composite structure of claim 28 wherein said hydrocarbon comprises propylene, butene-1, 4-methyl pentene-1, hexene-1 or octene-1.

30. The composite structure of claim 20 wherein said α-olefin of component (b)(3) comprises butene-1, 4-methyl pentene-1, hexene-1, octene-1, or pentene-1, or mixtures thereof.

31. The composite structure of claim 20 wherein said grafting monomer comprises at least one of acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)-non-7-ene, bicyclo(2.2.1)hept-5-ene-2,3-dicarboxylic acid anhydride, maleopimaric acid, tetrahydrophthalic anhydride, norborn-5-ene-2,3-dicarboxylic acid anhydride, Nadic anhydride, methyl Nadic anhydride, Himic anhydride, methyl Himic anhydride, and x-methyl bicyclo(2.2.1)hept-5-ene-2,3-dicarboxylic acid anhydride.

32. The composite structure of claim 20 wherein said structure comprises PP/adhesive/nylon.

33. The composite structure of claim 20 wherein said structure comprises PE/adhesive/nylon.

34. The composite structure of claim 20 wherein said structure comprises EVA/adhesive/nylon.

35. The composite structure of claim 20 wherein said structure comprises polyolefin/adhesive/vinyl alcohol polymer.

36. The composite structure of claim 20 wherein said structure comprises EVA/adhesive/EVOH.

37. The composite structure of claim 20 wherein said structure comprises PE/adhesive/polyester.

38. The composite structure of claim 20 wherein said structure comprises PE/adhesive/aluminum.

39. The composite structure of claim 20 wherein said structure comprises EVA/adhesive/aluminum.

40. The composite structure of claim 20 wherein said structure comprises PE/adhesive/steel.

41. The composite structure of claim 20 wherein said structure comprises PE/adhesive/copper.

42. The composite structure of claim 20 wherein said structure comprises EVA/adhesive/glass.

43. The composite structure of claim 20 wherein said structure comprises PE/adhesive/wood.

44. The composite structure of claim 20 wherein said structure comprises PE/adhesive/polyurethane.

45. The composite structure of claim 20 wherein said structure comprises PP/adhesive/polyester.

46. The composite structure of claim 20 wherein said structure comprises PP/adhesive/nylon/adhesive/EVA.

47. The composite structure of claim 20 wherein said structure comprises PE/adhesive/EVOH/adhesive/PE.

48. The composite structure of claim 20 wherein said structure comprises PE/adhesive/nylon/adhesive/EVA.

49. The composite structure of claim 20 wherein said structure comprises PE/adhesive/aluminum/adhesive/EVA.

50. The composite structure of claim 20 wherein said structure comprises PE/adhesive/EVOH.

51. The composite structure of claim 20 wherein said structure comprises PP/adhesive/EVOH.

52. The composite structure of claim 20 wherein said backbone of (b)(1) comprises polyethylene of a density within the range of 0.910–0.970 g/cc.

53. The composite structure of claim 20 wherein said (b)(2) comprises LDPE or LLDPE of a density within the range of 0.910–0.945 g/cc.

54. The composite structure of claim 20 wherein said backbone of (b)(1) comprises ethylene polymers or copolymers of ethylene with one or more alkenes.

55. The composite structure of claim 54 wherein said backbone of (b)(1) comprises a linear polyethylene of high, medium or low density.

56. The composite structure of claim 54 wherein said backbone of (b)(1) comprises blends of two or more of said polymers or copolymers.

57. The composite structure of claim 20 wherein said poly-α-olefin of blending component (b)(3) comprises poly(butene-1) of melt index 0.5 to 50 g/10 min. and a density within the range of 0.88–0.93 g/cc.

58. The composite structure of claim 1 wherein said components are adhered together by a method selected from the group consisting of blown film coextrusion, cast film coextrusion, blow molding coextrusion, lamination, extrusion or coextrusion coating, powder coating, rotomolding, profile coextrusion or wire coating extrusion or coextrusion.

59. The composite structure of claim 20 wherein said components are adhered together by a method selected from the group consisting of blown film coextrusion, cast film coextrusion, blow molding coextrusion, lamination, extrusion or coextrusion coating, powder coating, rotomolding, profile coextrusion or wire coating extrusion or coextrusion.

* * * * *